Patented Aug. 25, 1925.

1,551,320

UNITED STATES PATENT OFFICE.

DENNIS W. MULLEN, OF BROCKTON, MASSACHUSETTS.

PROCESS OF REPAIRING PATENT LEATHER.

No Drawing. Application filed November 28, 1924. Serial No. 752,803.

*To all whom it may concern:*

Be it known that I, DENNIS W. MULLEN, a citizen of the United States, and resident of Brockton, county of Plymouth, State of Massachusetts, have invented an Improvement in Process of Repairing Patent Leather, of which the following description is a specification.

This invention relates to repairing imperfections in patent leather.

In the manufacture of patent leather shoes it frequently happens that a shoe becomes damaged or scarred during the process of manufacture. Sometimes this damage is in the nature of a crack in the patent leather finish and sometimes in the nature of a mar or scratch. The damage may be occasioned in various ways, such for instance as by the stretching of the leather during the lasting operation or by the shrinking of the enamel or by carelessness in handling the shoes, etc.

It is now the common practice to repair any such damage to the patent leather by first sandpapering or abrading the damaged portion of the shoe to remove the enamel and expose the leather and then applying repair material in liquid form. This is usually done by hand, the workman frequently taking a piece of cheese cloth or similar material and wrapping it about his forefinger and then applying thereto some of the liquid from a bottle and rubbing the spot to be mended with the cloth. This rubing action, which is usually given with a circular motion, serves to rub the liquid repair material into the grain of the leather and as the repair material dries the continued rubbing action produces a polished surface. Sometimes a second application of liquid repair material of a little different consistency is made to give the final finish. This method of repair is not only slow because of the necessity of continuing the rubbing action while the liquid repair material is drying and until after it has thoroughly dried, but it is also more or less wasteful because in handling the liquid repair material a considerable portion of it may be absorbed in the cloth or spilled and only a relatively small part of the contents of a bottle actually applied to the patent leather in repairing the same.

It is an object of my present invention to provide an improved method of repairing patent leather which includes the use of repairing material in dry or solid form instead of in liquid form. This repair material in solid form may conveniently be made in the form of a stick and it is applied to the damaged portion of the patent leather by rubbing the latter with one end of the stick. The stick of repair material is so made and has such a consistency that during the rubbing action under pressure the repair material will be transferred from the stick to the surface being rubbed, and the rubbing action will rub it into the leather which has been exposed by the sandpapering process and will cause it to fill any cracks or scratches in the enamel. After the repair material has been applied in this way then it is polished or burnished by means of a cloth or burnishing wheel or in some other suitable way, which operation will give the repaired portion the same lustre as the non-damaged portion of the patent leather.

This method of applying the repair material by using it in solid stick form and rubbing the stick on the patent leather not only facilitates the operation but also provides for applying the repair material without waste.

The repair material is composed of a plurality of gums and waxes which are so compounded as to make a resultant mixture which is soft enough so that when a stick of the material is rubbed onto the patent leather the repair material is transferred from the stick to the patent leather but which does not become tacky or sticky at temperatures below 100° F.

The repair material as compounded from vegetable waxes and gums is in a certain sense friable without, however, being of a crumbly nature. It is dry and can be used and handled in even the warmest summer weather without becoming sticky or tacky.

When the repair material is subjected to high heat it will melt and become semi-fluid so that it can be poured into molds and I propose to put it up for use commercially in the form of "sticks" or "pencils" as this makes a convenient shape to be used in applying the material to the damaged patent leather.

While a satisfactory repair can be made by simply applying some of the dry repair material to the damaged part and then polishing it, yet it is sometimes desirable to apply a liquid finish coat which is formed of some suitable gum that is cut in alcohol, an excess of alcohol being used for this purpose. Such a liquid has a large amount of alcohol and a relatively small amount of gum and when it is applied to the patent leather the alcohol evaporates rapidly leaving the gum deposit which produces a highly lustrous surface. Where this liquid finish is used it is not necessary to polish the patent leather at all after the application of the liquid finish as when this finish dries by the evaporation of the alcohol therefrom a surface is produced which is not distinguishable from the original patent leather.

I claim:

1. The process of repairing patent leather which consists in applying to the damaged part repair material in solid form and under pressure, which repair material comprises a mixture of gums and waxes, burnishing the repaired part to give it a lustre and then applying a finishing coat in liquid form and which comprises a gum cut in alcohol.

2. The process of repairing patent leather which consists in rubbing the damaged part with a stick of repair material in solid form and comprising a mixture of waxes and gums, whereby said solid repair material is transferred to the leather and then burnishing the applied repair material to bring it to the desired lustre.

In testimony whereof, I have signed my name to this specification.

DENNIS W. MULLEN.